United States Patent
Douglas et al.

(10) Patent No.: US 11,544,090 B2
(45) Date of Patent: *Jan. 3, 2023

(54) IMPLEMENTING DEPENDENCY INJECTION VIA DIRECT BYTECODE GENERATION

(71) Applicant: Red Hat, Inc., Raleigh, NC (US)

(72) Inventors: Stuart Douglas, Orange (AU); Martin Kouba, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/214,098

(22) Filed: Mar. 26, 2021

(65) Prior Publication Data

US 2021/0216341 A1 Jul. 15, 2021

Related U.S. Application Data

(63) Continuation of application No. 16/670,401, filed on Oct. 31, 2019, now Pat. No. 10,963,275.

(51) Int. Cl.
*G06F 9/455* (2018.01)
*G06F 8/41* (2018.01)

(52) U.S. Cl.
CPC ............ *G06F 9/45529* (2013.01); *G06F 8/41* (2013.01)

(58) Field of Classification Search
None
See application file for complete search history.

(56) References Cited

U.S. PATENT DOCUMENTS

| | | |
|---|---|---|
| 8,607,203 B1 | 12/2013 | Mehra |
| 8,745,584 B2 | 6/2014 | Huang et al. |
| 8,856,734 B2 | 10/2014 | Thyagarajan et al. |
| 9,213,826 B2 | 12/2015 | Gu et al. |
| 9,535,726 B2 | 1/2017 | Lagerblad et al. |
| 10,078,574 B2 | 9/2018 | Lopian |
| 2002/0165995 A1 | 11/2002 | Matula |
| 2005/0066338 A1 | 3/2005 | Bloesch |
| 2008/0127049 A1 | 5/2008 | Elaasar |
| 2013/0174116 A1 | 7/2013 | Pfeifer |

FOREIGN PATENT DOCUMENTS

CN 102782693 B 11/2015

OTHER PUBLICATIONS

Red Hat, Inc.; Chapter 7. Contexts and Dependency Injection (CDI); Red Hat Customer Portal; Aug. 16, 2019; 20 Pages.

*Primary Examiner* — Qing Chen
(74) *Attorney, Agent, or Firm* — K&L Gates LLP

(57) ABSTRACT

A system includes a memory and a processor in communication with the memory. The processor is configured to process at least one application file and generate bytecode, responsive to processing the at least one application file, from the at least one application file prior to start-up time. The bytecode contains a metamodel and the metamodel controls dependency injection. Additionally, the metamodel is classified as at least one of a first class that is generated at start-up time, a second class that is generated as source files and compiled at compile time, and a third class that is generated directly as bytecode. The processor is also configured to store the bytecode associated with the third class of metamodel.

20 Claims, 6 Drawing Sheets

IMPLEMENTING DEPENDENCY INJECTION VIA DIRECT BYTECODE GENERATION

CROSS REFERENCES TO RELATED APPLICATIONS

This application is a continuation application of and claims priority to and the benefit of U.S. patent application Ser. No. 16/670,401 (now U.S. Pat. No. 10,963,275), filed Oct. 31, 2019, entitled "IMPLEMENTING DEPENDENCY INJECTION VIA DIRECT BYTECODE GENERATION", the entire disclosure of which is hereby incorporated by reference herein.

BACKGROUND

Computer systems may run applications or services that are provided via a server or cloud. The applications or services can be developed and deployed at start-up time. Application instances or services may run within containers, which may be run on physical or virtual machines. The containers may be used to separate various components of a computing system. For example, different components of a computing system may be executed at different containers and/or virtual machines executing on a computing device.

The containers may encapsulate a runtime environment for an application instance or service. Application instances may be started or replicated across nodes and each application instance may require configuration objects (e.g., lists, collections, arrays, etc. used for configuration), classes, artifacts, dependencies, annotations, libraries, etc. to be loaded at various times.

SUMMARY

The present disclosure provides new and innovative systems and methods for implementing dependency injection via direct bytecode generation. In an example, a system includes a memory and a processor in communication with the memory. The processor is configured to process at least one application file. The processor is also configured to generate bytecode, responsive to processing the at least one application file, from the at least one application file prior to start-up time. The bytecode contains a metamodel and the metamodel controls dependency injection. Additionally, the metamodel is classified as at least one of a first class that is generated at start-up time, a second class that is generated as source files and compiled at compile time, and a third class that is generated directly as bytecode. The processor is also configured to store the bytecode associated with the third class of metamodel.

In an example, a method includes processing at least one application file and responsive to processing the at least one application file, generating bytecode from the at least one application file prior to start-up. The bytecode contains a metamodel and the metamodel controls dependency injection. Additionally, the metamodel is classified as at least one of a first class that is generated at start-up time, a second class that is generated as source files and compiled at compile time, and a third class that is generated directly as bytecode. The method also includes storing the bytecode associated with the third class of metamodel.

In an example, a non-transitory machine-readable medium stores code, which when executed by a processor is configured to process at least one application file and responsive to processing the at least one application file, generate bytecode from the at least one application file prior to start-up time. The bytecode contains a metamodel and the metamodel controls dependency injection. Additionally, the metamodel is classified as at least one of a first class that is generated at start-up time, a second class that is generated as source files and compiled at compile time, and a third class that is generated directly as bytecode. The non-transitory machine-readable medium is also configured to store the bytecode associated with the third class of metamodel.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
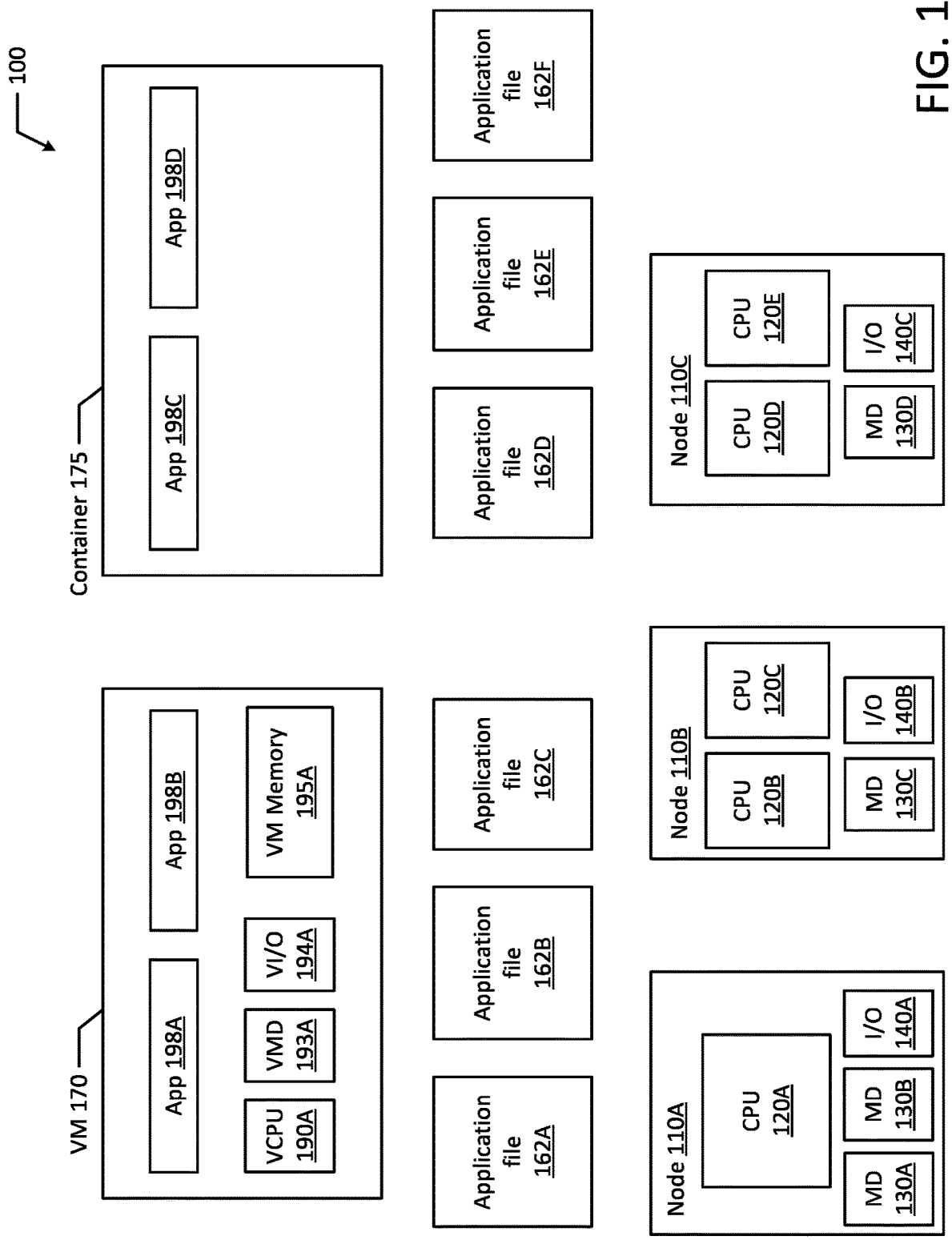
FIG. 1 illustrates a block diagram of an example computing system according to an example embodiment of the present disclosure.

Generally, dependency injection is implemented by building a metamodel that controls which objects get injected into each other. The metamodel or surrogate model provides the frames, rules, constraints, etc. for generating the application. Specifically, dependency injection is a technique whereby one object supplies the dependencies for another object and a dependency is an object that can be used as a service. Instead of a client specifying which service to use, the dependency informs the client what service to use. The injection refers to the passing of a dependency (e.g., a service) into the object (e.g., a client) that will use the dependency.

One approach is to generate a metamodel in memory at start-up time, which is the approach most systems use (e.g., Spring and Weld). When the application is started, the application is scanned and a metamodel is built from annotations discovered during the scanning process. However, generating application code at start-up time is a complex process. For example, when the metamodel is built at start-up time, annotations are parsed and then processed, which may involve loading several different classes, leading to an application with a larger memory footprint. The disadvantages associated with the slower start-up times and additional memory usage of generating the metamodel at start-up time are augmented when implementing application instances on a cloud. For example, hundreds to thousands of application instances may be deployed and started on the cloud, and each instance may incur these additional memory costs.

Another approach is to generate a metamodel at compile time. In this approach, the metamodel may be generated as JAVA source files, which are then compiled as part of the compilation process. The approach of generating the metamodel at compile time is used by systems such as Dagger and Micronaut™. However, generating the metamodel as part of the compilation process results in compiling additional files, which slows down the compilation process and may add to the memory footprint of the resulting application (the memory footprint is typically larger when generating the metamodel in memory at start-up time than generating the metamodel at compile time).

As noted above, both of the existing approaches have down sides. For example, generating a metamodel in memory at start-up time slows down application start-up and delays application start-up. Furthermore, generating the metamodel as JAVA source files that are compiled as part of the compilation process ties dependency injection to the compilation process and results in extra source files that are then compiled. The additional source files that require compilation can significantly slow down the compilation process and result in reduced developer productivity.

The techniques disclosed herein implement dependency injection via direct bytecode generation. Rather than generating source files that need to be compiled, bytecode is directly generated that contains the metamodel. The generated bytecode can then either be included in the application or loaded directly into a ClassLoader in memory. Additionally, by generating the bytecode directly, the resulting production applications created from the bytecode have a smaller memory footprint than both of the existing approaches discussed above.

Since the bytecode includes the metamodel, the metamodel can be packed in the application without having to build the metamodel at start-up. This reduces start-up time and also reduces memory usage, which is especially important for high density cloud environments. Additionally, directly generating the bytecode that contains the metamodel prevents extra code from being compiled at compile time, which allows for faster turnaround time for application developers, increasing productivity. Furthermore, because the techniques disclosed herein are not tied to the compilation process, updates may be handled in a much more flexible manner as applications can be updated without being completely recompiled.

FIG. 1 depicts a high-level component diagram of an example computing system 100 in accordance with one or more aspects of the present disclosure. The computing system 100 may include application files 162A-F, one or more virtual machines 170 or containers 175, and nodes (e.g., nodes 110A-C). Virtual machines 170 may be provisioned on the same host or node (e.g., node 110A) or different nodes. For example, a VM 170 and another VM (not pictured) may both be provisioned on node 110A. Alternatively, VM 170 may be provided on node 110A while another VM (not pictured) is provisioned on node 110B. Similarly, containers 175 may be provisioned on the same host or node (e.g., node 110A) or different nodes. For example, container 175 and another container (not pictured) may both be provisioned on node 110A. Alternatively, container 175 may be provisioned on node 110A while another container (not pictured) is provisioned on node 110B.

Computer systems may run applications or services that are provided via a server or cloud. The applications or services can be developed and deployed as a single unit or as multiple units. Applications 198A-D may run within virtual machines 170 or containers 175. The containers 175 may be run on or executed within physical or virtual machines 170. For example, containers 175 may encapsulate a lightweight runtime environment for an application. The virtual machines 170 or container 175 may be replicated across node clusters. The virtual machines 170 or containers 175 may each run a process, service or application (e.g., applications 198A-D). The virtual machine 170 or container 175 may be executed in any execution environment.

It should be appreciated that containers 175 may be stand-alone execution environments, similar to that of a virtual machine 170. In an example, container 175 may instead be a virtual machine 170 that execute applications or services. The applications 198A-D may run in a container 175 or a virtual machine 170.

Application files 162A-F, referred to herein generally as application files 198, may each be processed to generate bytecode for an application. For example, application files 162E-F may be processed to generate bytecode for application 198A. In another example, application files 162A-C may correspond to application 198A while application files 162D-F correspond to application 198B or 198C. Additionally, each application file (e.g., application file 162A) may correspond to a single application (e.g., application 198A). For example, an application file 162 may be a JAVA Archive ("JAR") file. A JAR file or JAR is a package file format typically used to aggregate many JAVA class files and associated metadata and resources (e.g., text, images, etc.). For example, the JAR file may correspond to a single application file (e.g., application file 162A) for distribution. JAR files may be "uber-jars", which may also be referred to as "over-jars" or "fat-jars", which are used to create single application packages.

A virtual machine 170 may include a virtual machine memory (VM Memory 195), a virtual CPU (VCPU 190), virtual memory devices (VMD 193), and virtual input/output devices (VI/O 194). In an example, a virtual machine may execute a guest operating system and run applications 198A-B which may utilize the underlying VCPU, VMD, and VI/O device. As mentioned above, one or more applications 198A-B may be running on a virtual machine under the respective guest operating system. A virtual machine may run on any type of dependent, independent, compatible, and/or incompatible applications on the underlying hardware and operating system ("OS"). Additionally, applications 198A-B run on a virtual machine may be compatible with the underlying hardware and/or OS.

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). The memory devices 130A-D may include native image cache (e.g., native image cache 132 of MD 130A). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E), generally referred to herein as processor(s) 120, may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

The processor(s) 120 may process application file(s) 162A-F. For example, the application files 162 may be unpackaged, extracted and processed. After processing the application file(s) 162A-F, the processor may generate bytecode from the application file(s) 162 prior to start-up time.

In an example, the bytecode contains a metamodel and the metamodel controls dependency injection. For example, metadata classes for each component of the application may be generated. Each component may be referred to as a bean (e.g., a Contexts and Dependency Injection (CDI) bean or JAVA bean). CDI beans are classes that CDI can instantiate, manage, and inject automatically to satisfy the dependencies of other objects. JAVA beans may be a class or classes that encapsulate many objects into a single object (e.g., the bean). Beans are serializable and allow access to properties using getter and setter methods.

The metadata classes, which expose the basic attributes of a bean, are wired together. In other words, the metamodel includes wired together metadata classes that create a fully injected and initialized component instance. For example, if "bean A" depends on "bean B", which depends on "bean C" then the metadata class for "A" holds a reference to the metadata class for "B", which holds a reference to the metadata class for "C". As a result, when a container creates "A", the container may call the metadata class for "A", which ultimately calls the metadata class for "B", which ultimately calls the metadata class for "C".

A metamodel may be generated at start-up time or may be generated as source files and compiled at compile time. However, the techniques disclosed herein implement dependency injection via direct bytecode generation, for example, the processor 120 directly generates the bytecode that contains the metamodel prior to start-up time. For example, the processor 120 may serialize application files into bytecode that contains the metamodel. Instead of generating a metamodel in memory at start-up time, which slows down application start-up and delays application start-up, the processor 120 directly generates bytecode that contains the metamodel, which can be packed in the application without having to build the metamodel at start-up, to avoid start-up delays.

In an example, the processor 120 may serialize the application files 162 into bytecode, which may also be referred to as portable code or p-code. The processor 120 may also serialize the application files into another type of intermediate representation. In an example, the processor 120 may serialize the application files 162 by passing the application files 162 to a serializer. For example, the serializer may receive the application files 162 and may output a serialization of the application files 162, and the resulting output may be bytecode that includes a metamodel for controlling dependency injection. Then, the bytecode may be executed to start an application instance. Processors 120 or VCPU 190A may each have their own serializer that runs on the processor.

Additionally, generating the metamodel as JAVA source files that are compiled as part of the compilation process ties dependency injection to the compilation process and results in extra source files that are then compiled, which can significantly slow down the compilation process and result in reduced developer productivity. Rather than generating source files that need to be compiled, the processor 120 directly generates bytecode, which can then either be included in the application or loaded directly into a ClassLoader in memory.

Furthermore, because the techniques disclosed herein are not tied to the compilation process, updates may be handled in a much more flexible manner as applications can be updated without being completely recompiled. The reduced start-up times, smaller memory footprints, and flexible application updates are especially important for high density cloud environments. For example, the techniques disclosed herein allow developers to perform "fast hot reloads", which advantageously provide fast development cycles and improved workflow while still keeping memory usage low. When performing a "fast hot reload" an application file, such as a JAVA file, may be modified, a browser may be refreshed, the application or service may be compiled, bytecode analysis may be re-run, and an updated page may be served. The same small memory footprint bytecode used to launch an application instance may be used during a development cycle, which allows for more efficient and flexible application updates to reduce test system latency while keeping memory usage low. The memory savings also reduces the amount of necessary hardware (e.g., RAM) for the system, and on larger scales, the reduction in necessary hardware may be quite significant.

Figure 2:
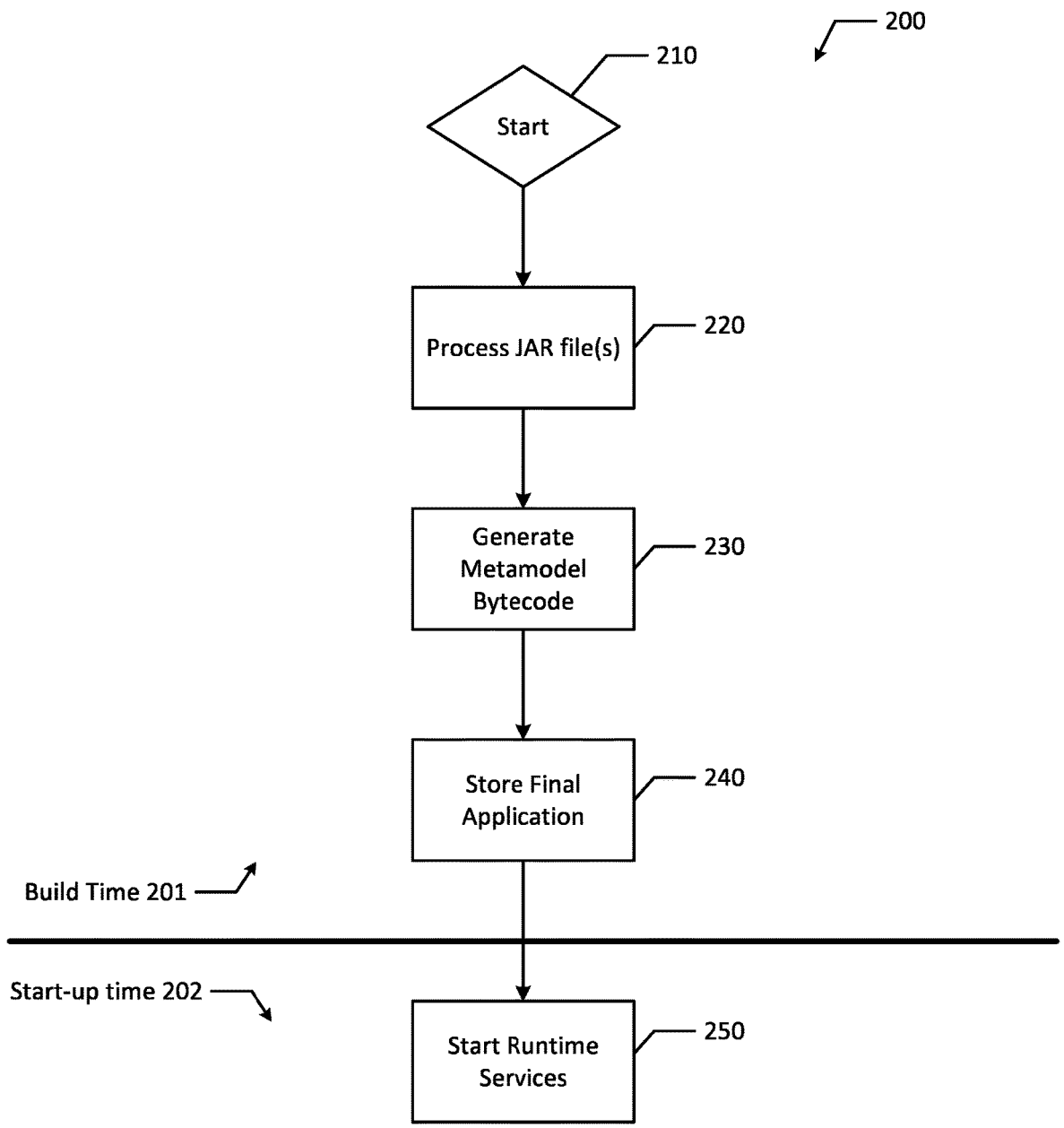
FIG. 2 illustrates a flowchart of an example process for building an application according to an example embodiment of the present disclosure.

FIG. 2 illustrates a flowchart of an example method 200 for implementing dependency injection via direct bytecode generation. The bytecode may be used for application deployment. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated, and some of the blocks described are optional. The method 200 may be performed by processing logic that may comprise hardware (circuitry, dedicated logic, etc.), software, or a combination of both.

The example method 200 includes starting an application build (block 210) prior to start-up time 202 (e.g., at build time 201). Then, method 200 includes processing JAVA Archive (JAR) file(s) (block 220). For example, a processor 120 may process application files 162A-F, such as JAR file(s). A JAR file or JAR is a package file format typically used to aggregate many JAVA class files and associated metadata and resources (e.g., text, images, etc.) into one file for distribution. JAR files may be "uber-jars", which may also be referred to as "over-jars" or "fat-jars", which are used to create single application packages.

The processor 120 may also generate metamodel bytecode (block 230). For example, the processor 120 may generate bytecode that includes the metamodel (e.g., metamodel bytecode), which controls the dependency injection. For example, the metamodel may control how metadata classes are wired or linked together. In other words, the metamodel creates a fully injected and initialized component instance of the application 198. For example, the metamodel provides the frames, rules, constraints, etc. for generating the application and controls which objects supply the dependencies for other objects.

After generation the metamodel bytecode, the metamodel bytecode, which is used for the final application, is stored (block 240). For example, the bytecode can be stored on the disk or it can be loaded directly into a ClassLoader in memory. At start-up time, the bytecode can be used to start runtime services of the application (block 250). Since the metamodel can be packed in the application without having to build the metamodel at start-up, the start-up time and memory usage of the application are advantageously reduced, which is especially important for high density cloud environments. Additionally, directly generating the bytecode that contains the metamodel prevents extra code from being compiled at compile time, which allows for faster turnaround time for application developers, increasing productivity.

Figure 3:
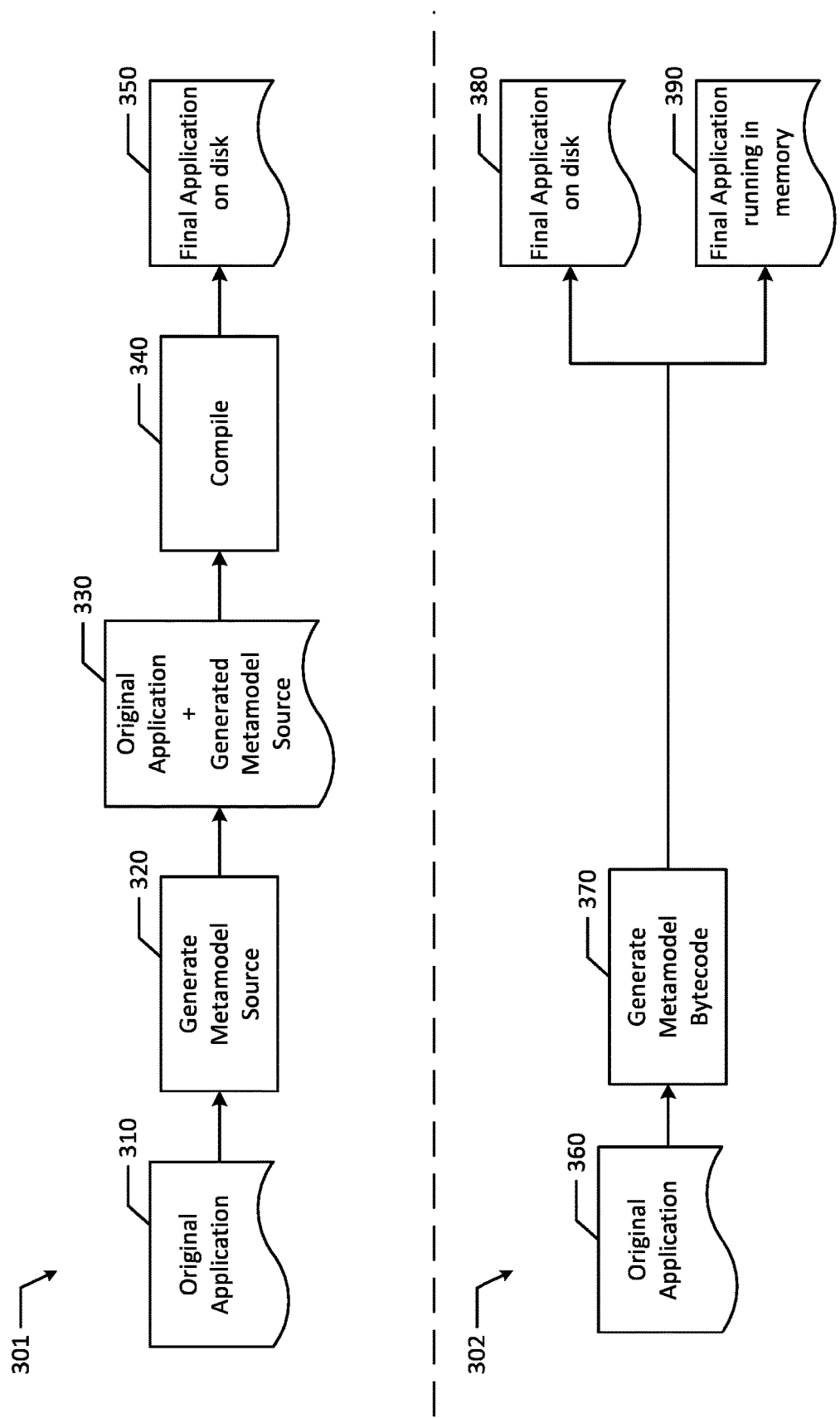
FIG. 3 illustrates methods for building an application according to various example embodiments of the present disclosure.

FIG. 3 illustrates processes 301, 302 for building an application 198. One approach, such as process 301, for creating a final application 198 on disk may include taking original application files 162 (block 310) and generating metamodel source code (block 320) at compile time. Then, the original application files 162 together with the generated metamodel source code (shown at block 330) are compiled (block 340). After compilation, the compiled files are saved as the final application on disk (block 350). However, generating the metamodel as source files that are compiled as part of the compilation process ties dependency injection to the compilation process and results in extra source files (e.g., the generated metamodel source files) that are then compiled. The additional source files that require compilation can significantly slow down the compilation process and result in increased test system latency.

Conversely, process 302 starts with the application source files 162 in the original application (block 360) and then implementing dependency injection via direct bytecode generation, which allows metamodel bytecode to be generated (block 370) directly from the application source files 162. The metamodel bytecode is built prior to start-up time, which advantageously allows for efficient application deployment at start-up time. Additionally, the metamodel bytecode is not tied to a compilation process, which allows for more efficient and flexible application updates. For example, the application updates may be achieved without completely recompiling the application 198. After generating the metamodel bytecode, the bytecode can be saved as the final application on disk (block 380) or as a final application running in memory (block 390). For example, the final application may be loaded into a ClassLoader in memory.

Figure 4:
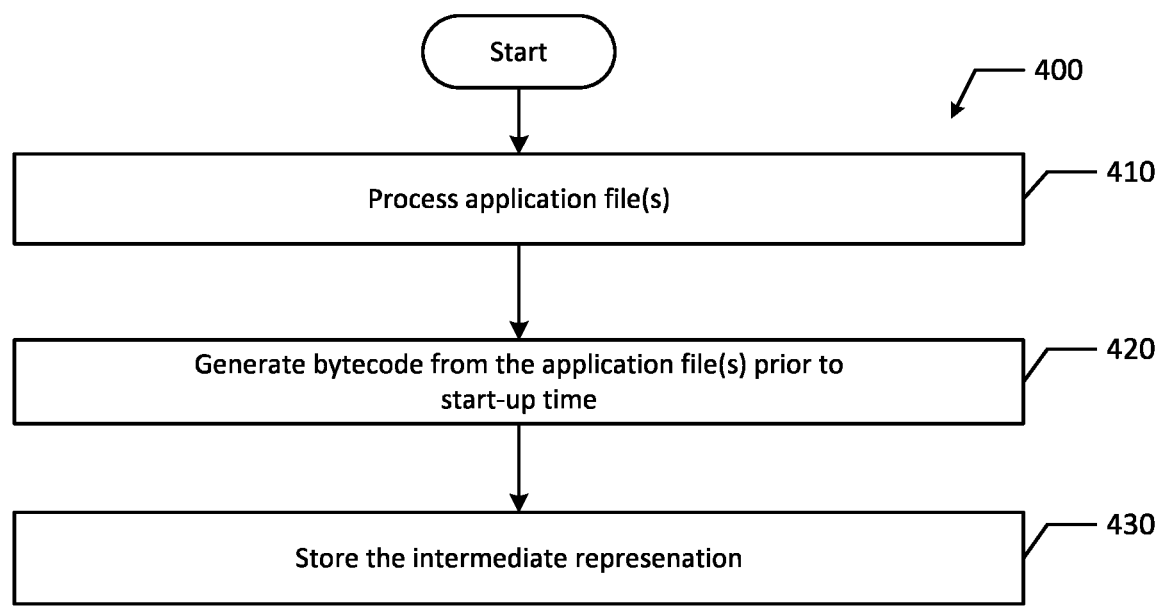
FIG. 4 illustrates a flowchart of an example process for implementing dependency injection via direct bytecode generation according to an example embodiment of the present disclosure.

FIG. 4 illustrates a flowchart of an example method 400 for serializing a framework container into a native image and executing the native image. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

The example method 400 includes processing application file(s) (block 410). For example, a processor 120 may process the application file(s) 162. Processing the application file(s) 162 may include loading the application files 162, unpackaging and extracting the files from a folder or ZIP folder, verifying the files, assigning memory references and resolving memory references for the files, and copying the files to a directory, etc. Processing the application file(s) 162 may also include rearranging, combining or linking the application files 162 (e.g., extracted application files) and passing the files to a serializer. Then, method 400 includes generating bytecode from the application file(s) prior to start-up time (block 420). For example, responsive to processing the application file(s) 162, the processor 120 may generate bytecode from the application file(s) prior to start-up. In an example, a serializer may serialize the application file(s) to output the bytecode. The bytecode may contain a metamodel that controls dependency injection. Unlike metamodels that are generated at start-up time or that are generated at source files and compiled at compile time, the processor 120 directly generates the metamodel as bytecode. Additionally, method 400 includes storing the bytecode as a final application file (block 430). For example, the processor 120 may store the bytecode that includes the metamodel. The bytecode may be stored on disk or as final application running in memory.

Figure 5:
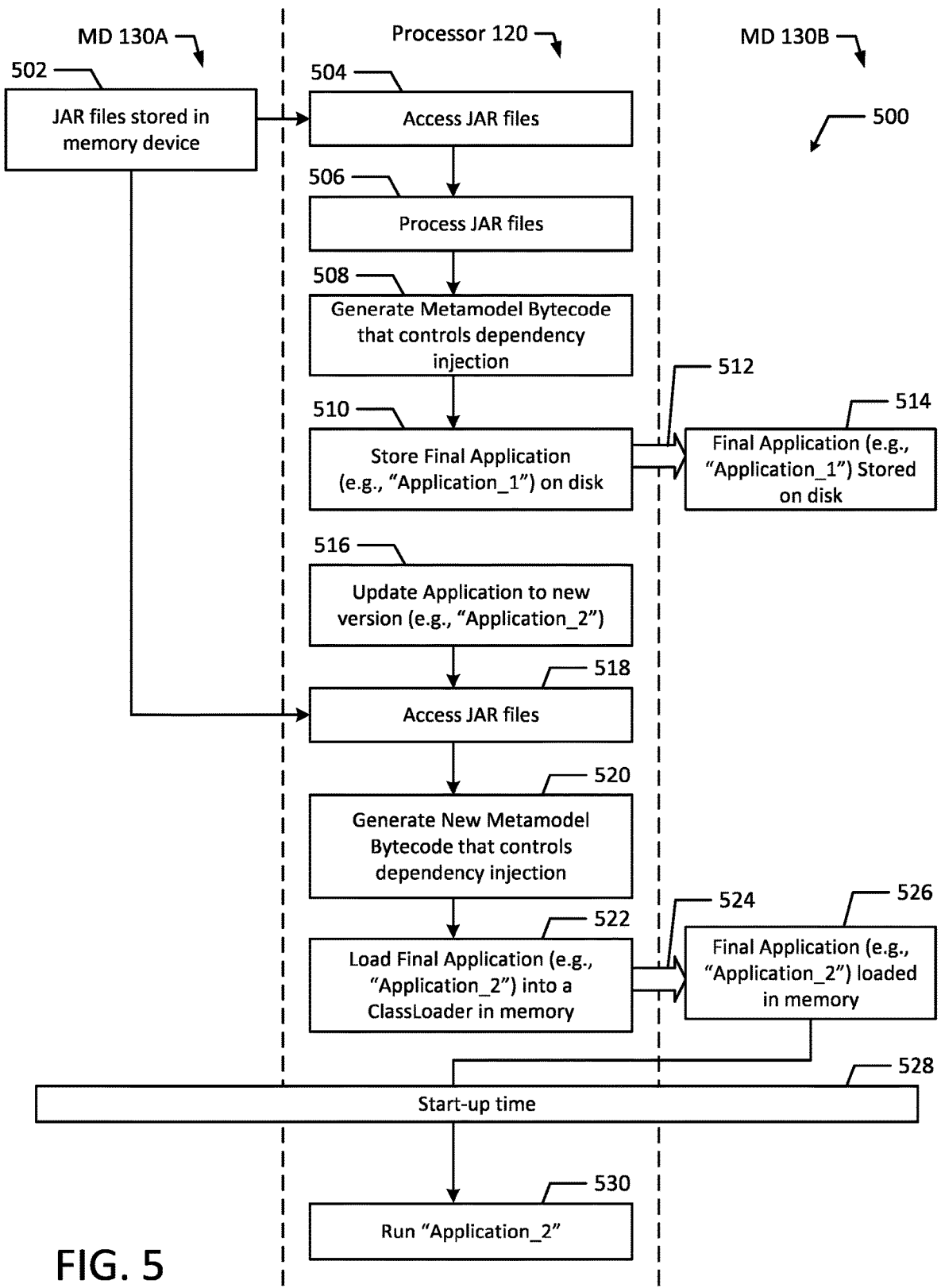
FIG. 5 illustrates a flow diagram of an example process for implementing dependency injection via direct bytecode generation according to an example embodiment of the present disclosure.

FIG. 5 illustrates a flowchart of an example method 500 for object serialization and application deployment in accordance with an example embodiment of the present disclosure. Although the example method 500 is described with reference to the flowchart illustrated in FIG. 5 it will be appreciated that many other methods of performing the acts associated with the method 500 may be used. For example, the order of some of the blocks may be changed, certain blocks may be combined with other blocks, blocks may be repeated, and some of the blocks described are optional. For example, a processor 120 may communicate with memory devices 130A and 130B and application files 162 to perform example method 500.

In the illustrated example, JAR files (e.g., application files 162) are stored in a memory device 130A (block 502). For example, the JAR files may be stored on memory device 130A in the ZIP file format. The processor 120 accesses the JAR files (block 504) and processes the JAR files (block 506). For example, the contents of the JAR files may be unpackaged, extracted and processed. While extracting the files, the processor 120 may make copies of the desired files and may write them into a current directory. Additionally, the processor 120 may create directory images, if the directory images do not already exist, and may place a copy of the desired files within the image. In other examples, other application files may be used such as application metadata, etc.

Then, the processor 120 generates metamodel bytecode that controls dependency injection from the JAR files (block 508). The metamodel may control dependency injection by identifying which objects supply dependencies other objects. For example, the metamodel may link or wire together several different objects that create a dependency chain. After generating the metamodel bytecode, the processor 120 stores the final application 512 (e.g., "Application_1") on disk (block 510). For example, by storing the bytecode for the final application 512 (e.g., "Application_1") on disk, the production application 512 has a smaller memory footprint.

Then, the final application 512 (e.g., "Application_1") is stored on disk, such as on memory device 130B (block 514). After the application is stored on disk, the bytecode may be used to deploy the application with the smaller memory footprint at start-up time. The memory savings become more substantial when starting nodes or application instances in cloud environments. For example, using an additional MB of memory at compilation time, build time, or at start-up time may not appear significant for a single application, but in cloud environments with thousands of nodes running application instances (where each would use an additional MB of memory), the memory savings is more pronounced on a large scale, the reduction in necessary hardware (e.g., RAM) may be quite significant.

As illustrated in FIG. 5, during the application development process, a developer may update the application to a new version. For example, the developer may initiate updating the application to a new version (e.g., "Application_2") using the processor 120 (block 516). The processor 120 may again access the JAR files (block 518) and generate new metamodel bytecode that controls dependency injection (block 520). For example, the processor 120 may generate new metamodel bytecode from the same JAR files. The new metamodel bytecode may include a different dependency chain than the bytecode generated for "Application_1."

In order to allow for additional development, the processor 120 may load the final application 524 (e.g., "Application_2") into a ClassLoader in memory (block 522). For example, the processor 120 may load the bytecode for the final application 524 (e.g., "Application_2") in memory. In an example, the ClassLoader may be a JAVA ClassLoader, which is a part of a JAVA Runtime Environment ("JRE") that dynamically loads JAVA classes into a JAVA Virtual Machine. The ClassLoader may be responsible for locating libraries, reading their contents, and loading the classes contained within the libraries. This loading is typically done on-demand, in that it does not occur until the class is called by the program.

Then, the final application 524 (e.g., "Application_2") is loaded in memory (block 526). In an example, JAVA classes are loaded into memory when required by an application instead of being loaded all at once. At this point, the Java ClassLoader is called by the JRE and the ClassLoaders load classes into memory dynamically. By loading the final application (e.g., "Application_2") in memory, additional application updates can be generated on the fly and allows for faster workflow in testing environments.

At start-up time (block 528), the processor 120 may run the application 524 (e.g., "Application_2") (block 530). The metamodel bytecode may be used to run several different instances of the application 524 across different nodes. The present disclosure is especially advantageous to cloud providers that want to optimize the efficiency of the cloud by reducing start-up times and reducing memory usage. For example, runtime services of an application 524 started from the generated metamodel bytecode may allow for almost instant start-up times and require less memory as compared to traditional approaches.

Figure 6:
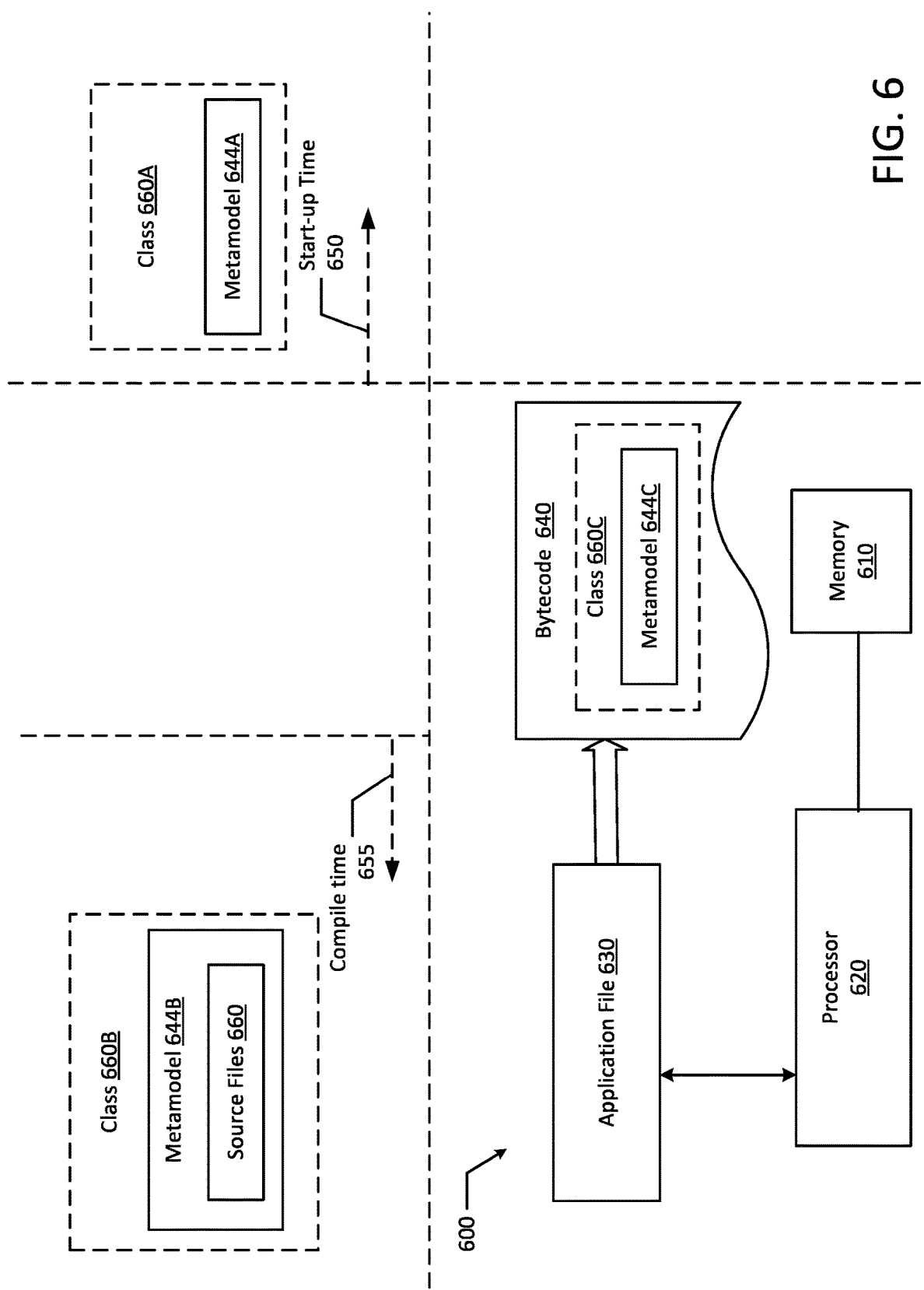
FIG. 6 illustrates a block diagram of an example dependency injection and bytecode generation system according to an example embodiment of the present disclosure.

FIG. 6 is a block diagram of an example serialization system 600 according to an example embodiment of the present disclosure. The serialization system 600 includes a memory 610 and a processor 620 in communication with the memory 610. The processor 620 is configured to process at least one application file 630. Responsive to processing the at least one application file 630, the processor 620 is configured to generate bytecode 640 from the at least one application file 630 prior to start-up time 650. The bytecode 640 contains a metamodel (e.g., metamodel 644C) and the metamodel (e.g., metamodel 644C) controls dependency injection. Additionally, the metamodel is classified as at least one of a first class 660A that is generated at start-up time 650 (e.g., metamodel 644A), a second class 660B that is generated as source files 660 and compiled at compile time 655 (e.g., metamodel 644B), and a third class 660C that is generated directly as bytecode 640 (e.g., metamodel 644C). The processor 120 is also configured to store the bytecode 640 associated with the third class 660C of metamodel 644C.

By generating the bytecode 640 with the metamodel (e.g., metamodel 644C) prior to start-up time, the resulting application uses less memory, provides increased start-up efficiency, and reduces overall application deployment resource requirements. For example, during application deployment, developers may save time and reduce the instant memory consumption of the application instance(s) at start-up, thereby reducing the memory footprint of the application instance(s) during the application's life.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A system comprising:
a memory; and
a processor, in communication with the memory, configured to:
process at least one application file;

prior to start-up time of the at least one application file, generate bytecode from the at least one application file responsive to processing the at least one application file, wherein:
the bytecode associated with the at least one application file contains a metamodel configured to control dependency injection, and
the metamodel is generated directly as bytecode; and
store the bytecode associated with the metamodel.

2. The system of claim 1, wherein the processor is further configured to store the bytecode associated with the at least one application file as one of (i) a final application file on disk or (ii) a final application running in the memory.

3. The system of claim 1, wherein the processor is further configured to load the bytecode associated with the at least one application file directly into a ClassLoader in the memory.

4. The system of claim 1, wherein processing the at least one application file occurs prior to the start-up time of the at least one application file.

5. The system of claim 1, wherein controlling dependency injection includes identifying which objects supply dependencies for other objects.

6. The system of claim 1, wherein the bytecode associated with the at least one application file is Java Virtual Machine bytecode.

7. The system of claim 1, wherein the processor is a virtual processor, and wherein the virtual processor executes in a virtual machine.

8. The system of claim 1, wherein the metamodel is adapted to be pre-built and packaged in the at least one application file without being built at the start-up time of the at least one application file.

9. The system of claim 1, wherein the at least one application file includes a Java Archive (JAR) file.

10. The system of claim 1, wherein the at least one application file includes a plurality of class files.

11. A method comprising:
process at least one application file;
prior to start-up time of the at least one application file, generate bytecode from the at least one application file responsive to processing the at least one application file, wherein:
the bytecode associated with the at least one application file contains a metamodel configured to control dependency injection, and
the metamodel is generated directly as bytecode; and
store the bytecode associated with the metamodel.

12. The method of claim 11, further comprising storing the bytecode associated with the at least one application file as one of (i) a final application file on disk or (ii) a final application running in a memory.

13. The method of claim 11, wherein processing the at least one application file occurs prior to the start-up time of the at least one application file.

14. The method of claim 11, wherein controlling dependency injection includes identifying which objects supply dependencies for other objects.

15. The method of claim 11, wherein the bytecode associated with the at least one application file is Java Virtual Machine bytecode.

16. The method of claim 11, wherein the metamodel is adapted to be pre-built and packaged in the at least one application file without being built at the start-up time of the at least one application file.

17. The method of claim 11, wherein the at least one application file includes a Java Archive (JAR) file.

18. The method of claim 11, wherein the at least one application file includes a plurality of class files.

19. The method of claim 11, further comprising loading the bytecode associated with the at least one application file directly into a ClassLoader in a memory.

20. A non-transitory machine-readable medium storing code, which when executed by a processor, is configured to:
process at least one application file;
prior to start-up time of the at least one application file, generate bytecode from the at least one application file responsive to processing the at least one application file, wherein:
the bytecode associated with the at least one application file contains a metamodel configured to control dependency injection, and
the metamodel is generated directly as bytecode; and
store the bytecode associated with the metamodel.

* * * * *